(12) United States Patent
Ye et al.

(10) Patent No.: US 9,392,039 B2
(45) Date of Patent: Jul. 12, 2016

(54) METHOD AND APPARATUS FOR IMPLEMENTING USER RELATIONSHIP IN SOCIAL NETWORK APPLICATION

(71) Applicant: Tencent Technology (Shenzhen) Company Limited, Shenzhen (CN)

(72) Inventors: Wa Ye, Shenzhen (CN); Tianqing Huang, Shenzhen (CN); Bin Chen, Shenzhen (CN)

(73) Assignee: TENCENT TECHNOLOGY (SHENZHEN) COMPANY LIMITED, Shenzhen, Guangdong Province (CN)

( * ) Notice: Subject to any disclaimer, the term of this patent is extended or adjusted under 35 U.S.C. 154(b) by 179 days.

(21) Appl. No.: 14/089,626

(22) Filed: Nov. 25, 2013

(65) Prior Publication Data
US 2014/0082088 A1    Mar. 20, 2014

Related U.S. Application Data

(63) Continuation of application No. PCT/CN2013/075549, filed on May 13, 2013.

(30) Foreign Application Priority Data

Jul. 12, 2012    (CN) .......................... 2012 1 0241232

(51) Int. Cl.
*G06F 15/16*    (2006.01)
*H04L 29/06*    (2006.01)
(Continued)

(52) U.S. Cl.
CPC .............. *H04L 65/403* (2013.01); *G06Q 10/10* (2013.01); *G06Q 50/01* (2013.01);
(Continued)

(58) Field of Classification Search
CPC .............. H04L 61/15–61/1594; H04L 12/588; H04L 51/32; G06Q 50/01
See application file for complete search history.

(56) References Cited

U.S. PATENT DOCUMENTS

2005/0171799 A1    8/2005    Hull et al.
2007/0161382 A1*   7/2007    Melinger ................ H04L 67/18
                                                                    455/456.1
(Continued)

FOREIGN PATENT DOCUMENTS

CN    1933398 A      3/2007
CN    101090404 A    12/2007
(Continued)

OTHER PUBLICATIONS

Tencent Technology, ISRWO, PCT/CN2013/075549, Aug. 29, 2013, 10 pgs.

(Continued)

*Primary Examiner* — Brendan Higa
(74) *Attorney, Agent, or Firm* — Morgan, Lewis & Bockius LLP

(57) ABSTRACT

The present invention provides a method and an apparatus for establishing a user relationship in a social networking application to improve the information security. The method includes: receiving a user addition request; determining whether the user addition request is initiated from a predefined trustworthy relationship scenario, and if not, performing verification on a user initiating the request; and establishing a user relationship according to a verification result. The apparatus includes: a request acquisition module, configured to receive the user addition request; a scenario determining module, configured to determine whether there is a predefined trustworthy relationship scenario associated with the request, and if not, inform a verification module; the verification module, configured to perform verification on a user initiating the request, and inform a relationship establishing module of a verification result; and the relationship establishing module, configured to establish the user relationship.

19 Claims, 8 Drawing Sheets

(51) Int. Cl.
*H04L 29/12* (2006.01)
*G06Q 10/10* (2012.01)
*G06Q 50/00* (2012.01)
*H04L 29/08* (2006.01)
*H04M 3/38* (2006.01)
*H04M 7/00* (2006.01)

(52) U.S. Cl.
CPC ......... *H04L 61/1594* (2013.01); *H04L 63/102* (2013.01); *H04L 67/306* (2013.01); *H04M 3/38* (2013.01); *H04M 7/0024* (2013.01)

(56) References Cited

U.S. PATENT DOCUMENTS

| | | | | |
|---|---|---|---|---|
| 2008/0205655 | A1* | 8/2008 | Wilkins | G06Q 10/10 380/279 |
| 2009/0006111 | A1* | 1/2009 | Shahine | G06Q 10/10 705/12 |
| 2009/0177744 | A1* | 7/2009 | Marlow | G06Q 10/10 709/204 |
| 2009/0228486 | A1* | 9/2009 | Kuehr-McLaren | G06F 17/3089 |
| 2010/0005520 | A1* | 1/2010 | Abbot | G06Q 30/0255 726/6 |
| 2010/0015975 | A1* | 1/2010 | Issa | H04L 63/102 455/435.1 |
| 2012/0036018 | A1* | 2/2012 | Feliciano | G06Q 30/02 705/14.66 |
| 2012/0209926 | A1* | 8/2012 | Backholm | G06Q 50/01 709/206 |
| 2012/0226701 | A1* | 9/2012 | Singh | G06F 21/40 707/748 |
| 2013/0166726 | A1* | 6/2013 | Boldyrev | G06Q 50/01 709/224 |
| 2013/0318085 | A1* | 11/2013 | Pepper | G06Q 10/10 707/737 |
| 2014/0006977 | A1* | 1/2014 | Adams | H04L 51/32 715/758 |

FOREIGN PATENT DOCUMENTS

| | | |
|---|---|---|
| CN | 101237426 A | 8/2008 |
| CN | 102054127 A | 5/2011 |
| CN | 102340458 A | 2/2012 |
| CN | 102843421 A | 12/2012 |
| JP | 2008517402 A | 5/2008 |
| JP | 2009169606 A | 7/2009 |
| JP | 2011081670 A | 4/2011 |
| JP | 2013521562 A | 10/2013 |
| JP | 2013543187 A | 11/2013 |
| WO | WO 2011108844 A2 | 9/2011 |
| WO | WO 2012061318 A1 | 5/2012 |

OTHER PUBLICATIONS

Tencent Technology, IPRP, PCT/CN2013/075549, Jan. 13, 2015, 5 pgs.

* cited by examiner

METHOD AND APPARATUS FOR IMPLEMENTING USER RELATIONSHIP IN SOCIAL NETWORK APPLICATION

RELATED APPLICATIONS

This application is a continuation application of PCT Patent Application No. PCT/CN2013/075549, entitled "METHOD AND APPARATUS FOR IMPLEMENTING USER RELATIONSHIP IN SOCIAL NETWORK APPLICATION" filed on May 13, 2013, which claims priority to Chinese Patent Application No. 201210241232.7, entitled "METHOD AND APPARATUS FOR IMPLEMENTING USER RELATIONSHIP IN SOCIAL NETWORK APPLICATION" filed Jul. 12, 2012, both of which are incorporated by reference in their entirety.

TECHNICAL FIELD

The disclosed implementations relate generally to Internet technologies, and in particular, to a method and an apparatus for establishing a user relationship in a social networking application.

BACKGROUND

With the development of various network applications, social networking applications in the Internet also develop quickly and strongly. A user can implement interaction with other users through user relationship information in various different social networking applications. In a social networking application, a new user relationship may be established through the user relationship information in other social networking applications, that is, a new user relationship is established in a currently used social networking application through various different relationship scenarios, for example, a new user relationship may be established by importing user relationship information in such two relationship scenarios as the social networking application based on a location-based service and an address book. Specifically, the currently used social networking application, the social networking application based on the location-based service, and the address book can all be identified through corresponding user identifiers. In the currently used social networking application, any user can bind an identifier A with an identifier B of the social networking application based on the location-based service and an identifier C of the address book respectively, and establish correlations between the identifier A and the identifier B, and between the identifier A and the identifier C. At this time, a user D related to the current user in the social networking application based on the location-based service is obtained according to the inter-relationship between the identifier A and the identifier B, and the user D also has a corresponding identifier in the used social networking application. Further, a user relationship with the user D is established in the used social networking application. In this way, the user relationship in the social networking application based on the location-based service is directly imported into the currently used social networking application, and the user directly establishes a user relationship based on the currently used social networking application with the user in this relationship scenario. Correspondingly, a user relationship between a user and a contact person in the address book can be established in the currently used social networking application through the identifier A and the identifier C.

However, the users are strangers in the user relationship directly established by importing the relationship scenario of the social networking application based on the location-based service into the currently used social networking application, and they are not familiar with each other. However, even being a stranger, the user can look at information, such as a photo album, published by other users in the currently used social networking application at will, causing information insecurity in the social networking application.

SUMMARY

In view of this, a method for establishing a user relationship in a social networking application is provided, so as to improve information security.

In addition, an apparatus for establishing a user relationship in a social networking application is provided necessarily, so as to improve information security.

The method for establishing a user relationship in a social networking application includes the following steps:

receiving a user addition request;

determining whether the user addition request is initiated from a predefined trustworthy relationship scenario, and if not, performing verification on an identifier of a user initiating the user addition request, and establishing a user relationship according to a verification result.

The apparatus for establishing a user relationship in a social networking application includes:

a request acquisition module, configured to receive a user addition request;

a scenario determining module, configured to determine whether the user addition request is initiated from a predefined trustworthy relationship scenario, and if not, informing a verification module;

the verification module, configured to perform verification on an identifier of a user initiating the user addition request, and inform a relationship establishing module of a verification result; and the relationship establishing module, configured to establish a user relationship.

In accordance with some implementations, a method for adding a second user to a first user's contact list is performed at a server having one or more processors and memory for storing programs to be executed by the one or more processors. Upon receipt of a user addition request from a first client device associated with the first user, the user addition request including an identifier of the second user, the server determines a relationship scenario between the first user and the second user. If the relationship scenario indicates that the second user is an acquaintance of the first user, the server checks an account associated with the second user to determine whether the second user requires a verification procedure for linking the second user to another user and adds the second user's identifier to the first user's contact list if there is no verification procedure according to the account associated with the second user. If the relationship scenario indicates that the second user is a stranger to the first user or if there is a verification procedure according to the account associated with the second user, the server sends a user verification request to a second client device associated with the second user and adds the second user's identifier to the first user's contact list after receiving a positive response from the second client device.

In accordance with some implementations, a server includes one or more processors; memory; and a plurality of programs stored in the memory and to be executed by the one or more processors. The programs include instructions for: receiving a user addition request from a first client device associated with the first user, the user addition request including an identifier of the second user; determining a relationship scenario between the first user and the second user; if the relationship scenario indicates that the second user is an acquaintance of the first user: checking an account associated with the second user to determine whether the second user requires a verification procedure for linking the second user to another user; and adding the second user's identifier to the first user's contact list if there is no verification procedure according to the account associated with the second user; if the relationship scenario indicates that the second user is a stranger to the first user or if there is a verification procedure according to the account associated with the second user: sending a user verification request to a second client device associated with the second user; and adding the second user's identifier to the first user's contact list after receiving a positive response from the second client device.

In the foregoing method and apparatus for establishing a user relationship in a social networking application, after the user addition request is acquired, it is determined whether the relationship scenario where the user addition request is initiated is the trustworthy relationship scenario; if the scenario is not the trustworthy relationship scenario, verification is performed on the identifier of the user initiating the user addition request; and the user relationship can be established merely when the verification succeeds, so as to prevent the user initiating the user addition request from looking at the information of other users in the social networking application at will when the user identifier is a stranger, thereby improving information security in the social networking application.

BRIEF DESCRIPTION OF DRAWINGS

The aforementioned implementation of the invention as well as additional implementations will be more clearly understood as a result of the following detailed description of the various aspects of the invention when taken in conjunction with the drawings. Like reference numerals refer to corresponding parts throughout the several views of the drawings.

DETAILED DESCRIPTION

Figure 1:
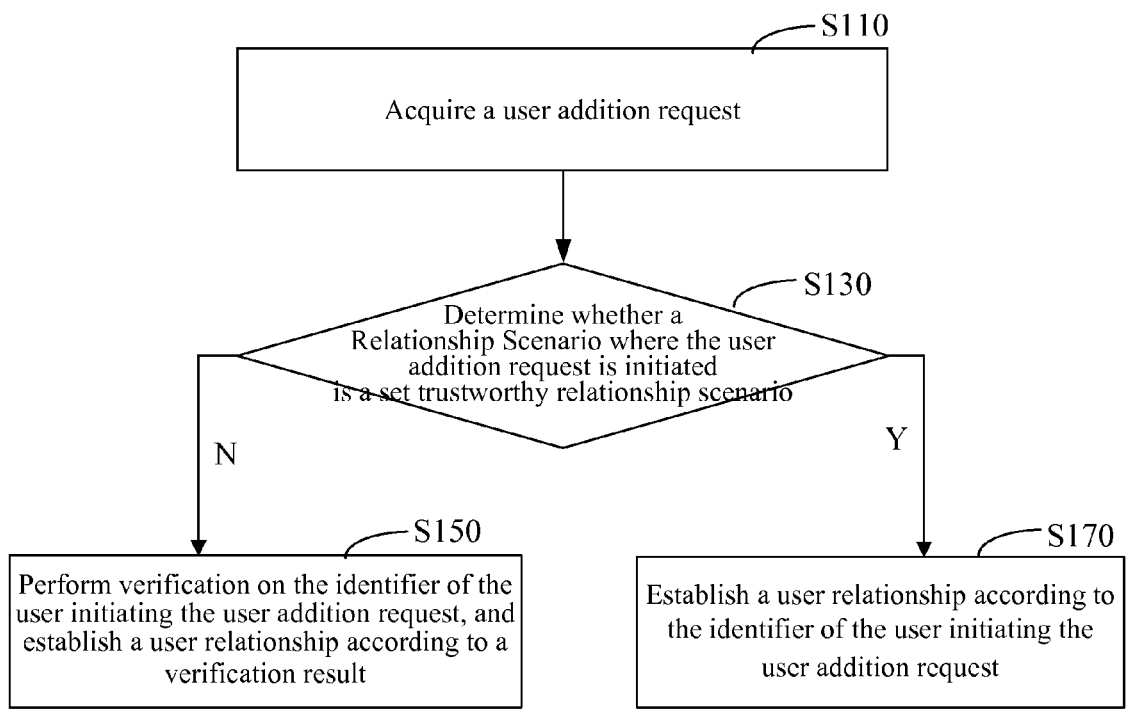
FIG. 1 is a flow chart of a method for establishing a user relationship in a social networking application according to an implementation.

As shown in FIG. 1, in an implementation, a method for establishing a user relationship in a social networking application includes the following steps.

Step S110: Receive a user addition request.

In this implementation, after a user addition request initiated by a user through a social networking application is received, the received user addition request is acquired, and a specific user initiating a request for establishing a user relationship based on the social networking application is known through the user addition request.

Specifically, the user relationship is an inter-relationship between a current user and other users in the social networking application. For example, there is a user relationship between each contact person recorded in an address book of a social networking application installed on a mobile terminal and a user of the mobile terminal; the social networking application stores, through the received user addition request, a contact person who requests to be added in the user relationship in the address book, to establish an inter-relationship between the mobile terminal user and the contact person who requests to be added in the user relationship. In addition, the user relationship may also be a friend relationship, an inter-relationship between a contact person based on an e-mail and a user of the e-mail, and the like, and the details are not listed herein.

Figure 2:
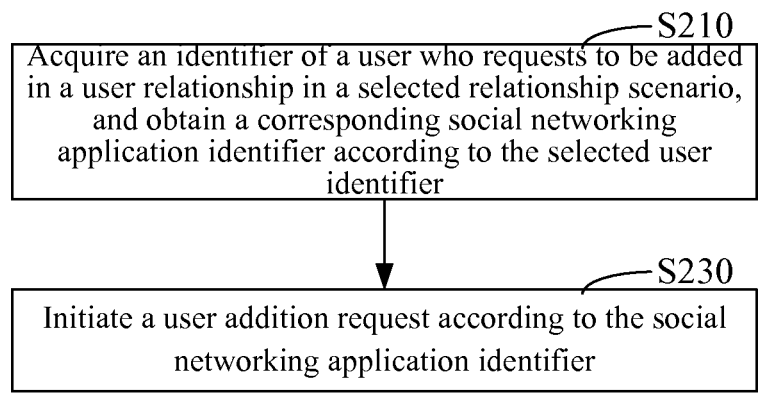
FIG. 2 is a flow chart of a method for establishing a user relationship in a social networking application according to another implementation.

As shown in FIG. 2, in another implementation, before Step S110, the method further includes the following steps:

Step S210: Acquire, from a predefined relationship scenario, an identifier of a user who requests to be added in a user relationship, and obtain a corresponding social networking application identifier according to the user identifier.

In this implementation, the relationship scenario is a source of users with whom a user relationship is expected to be established. For example, the relationship scenario is a certain social networking application in which there is an existing user relationship between a user with whom a user relationship is expected to be established and the user initiating the user addition request. For example, in a social networking application like an instant communication tool, a user can be selected through a selection operation in a user list obtained through a scenario that allows strangers at the same location to make friends, and further, an instant communication identifier corresponding to the selected user is obtained according to a correspondence between a user identifier and an instant communication tool identifier. Note that the selected user and the user triggering the selection operation are strangers to each other.

In addition to the relationship scenario of the user relationship obtained through a location-based friends making approach, the relationship scenario may also be a user relationship obtained through a topic-based friends making approach in a social networking application, or may be a user relationship obtained through a behavior-based friends making approach; and may also be a user relationship based on information of a phone address book or an e-mail contact person; the details are not listed herein. The foregoing selected relationship scenario is different from the relationship scenario in the currently used social networking application.

Step S230: Initiate a user addition request according to the social networking application identifier.

In this implementation, after the social networking application identifier corresponding to the selected user identifier is obtained, a user addition request is initiated, according to the social networking application identifier, to a client where the social networking application identifier is located.

In the foregoing method for establishing a user relationship in a social networking application, a user obtains, through selection, a user identifier in the currently used social networking application according to user relationship information in a relationship scenario, and there is a user relationship between this user and another user corresponding to the user identifier; a social networking application identifier in terms of the user in the social networking application currently used by the user is obtained according to the user identifier, and then, a user addition request for establishing a user relationship based on the currently used social networking application is initiated to the user.

Step S130: Determine whether the user addition request is initiated from a predefined trustworthy relationship scenario; if not, enter Step S150; and if yes, enter Step S170.

In this implementation, the received user addition request includes information such as a social networking application identifier corresponding to the user initiating the user addition request and a relationship scenario where the user addition request is triggered. For example, when the initiated user addition request is received, the user may know, by viewing an interaction interface of the social networking application, an identifier of a user initiating the user addition request and know which user relationship information, that is, which relationship scenario, the user initiating the user addition request comes from.

In the interaction between users via the Internet, the existing user relationship may on the basis of strangers, and may also on the basis of acquaintances. Compared with a relationship scenario obtained when the users are strangers to each other, the user relationship information namely, the relationship scenario obtained when the users are acquaintances to each other should be trustworthy. The possibility that the users from the trustworthy relationship scenario threaten the information security of the currently used social networking application is low; instability exists when the user is not from the trustworthy relationship scenario, and identification verification should be performed thereon.

Step S150: Perform verification on an identifier of a user initiating the user addition request, and establish a user relationship according to a verification result.

In this implementation, verification is performed on a user initiating the user addition request to obtain a verification result, and it is determined whether the verification result is that the verification succeeds; if yes, the user relationship is established; and if not, the flow ends.

Step S170: Establish a user relationship according to the identifier of the user initiating the user addition request.

In another implementation, before Step S170, the method further includes the following step:

checking whether to perform verification on an identifier of a user initiating the user addition request in the trustworthy relationship scenario; if yes, entering Step S150; and if not, entering step S170.

In this implementation, when it is determined that the relationship scenario where the user addition request is initiated is the trustworthy relationship scenario, it is checked whether an option of performing verification on the identifier of the user initiating the user addition request in the trustworthy relationship scenario is set; if yes, verification is performed on the identifier, to further improve information security in the social networking application; and if not, the user relationship is directly established.

Figure 3:
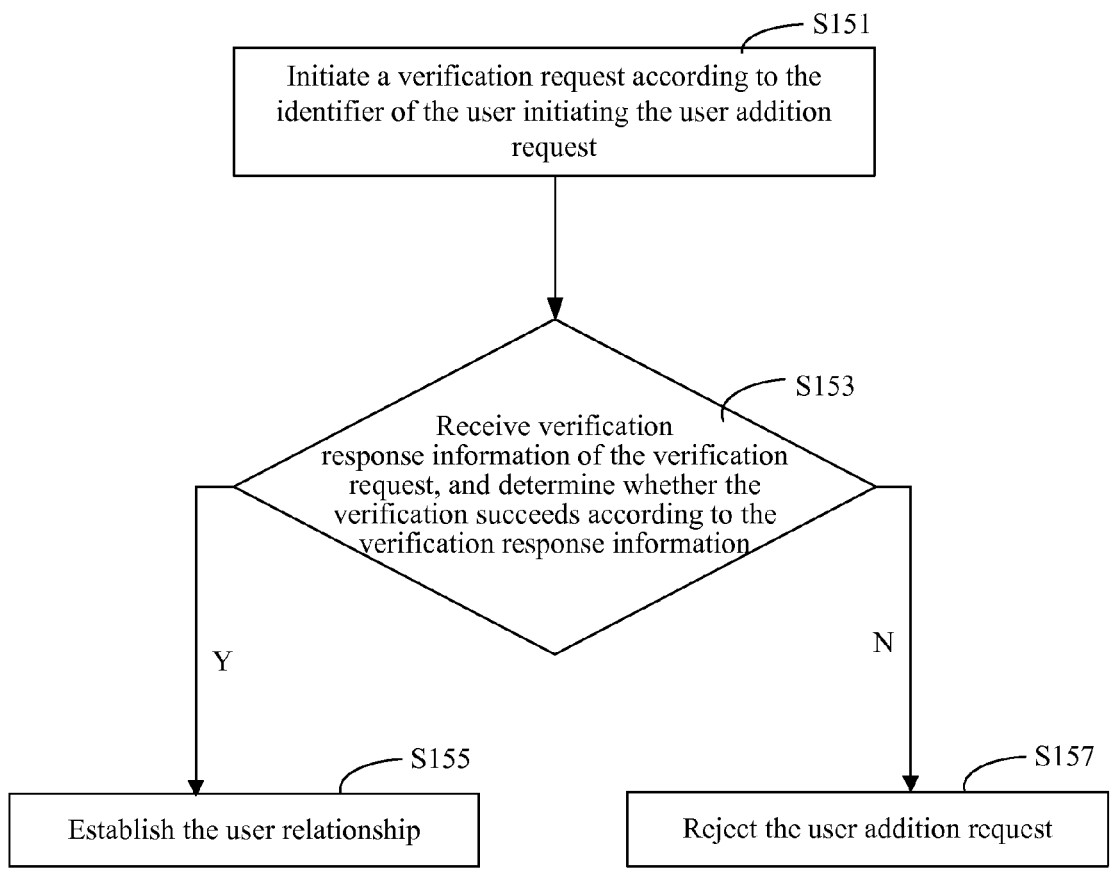
FIG. 3 is a flow chart of a method for performing verification on an identifier of a user initiating a user addition request, and establishing a user relationship according to a verification result according to an implementation.

As shown in FIG. 3, in another implementation, a specific process of Step S150 includes the following sub-steps.

Step S151: Initiate a verification request according to the identifier of the user initiating the user addition request.

In this implementation, a verification request is initiated to a client where the identifier of the user initiating the user addition request is located, so that the user initiating the user addition request performs identification verification according to the verification request.

Step S153: Receive verification response information of the verification request, and determine whether the verification succeeds according to the verification response information; if yes, enter Step S155; and if not, enter Step S157.

In this implementation, after receiving the verification request, the client where the identifier of the user initiating the user addition request is located obtains the verification response information according to the verification request, where the verification response information is generated when the user replies to the verification request, so as to determine whether the received verification response information conforms to preset verification information, and if yes, a user relationship is directly established.

For example, the verification request includes a question preset by the user. After the verification request is received, the user replies to the preset question to generate the verification response information, so as to determine whether the content recorded in the verification response information is consistent with a preset answer to the question; if yes, the user relationship is established, and if not, the received user addition request is rejected.

Step S155: Establish the user relationship.

Step S157: Reject the user addition request.

The following describes the method for establishing a user relationship in a social networking application in details with reference to a specific implementation. In this implementation, the users are friends. After a friend addition request initiated by the user through the social networking application is received, an identifier of a friend who requests to be added in a friend relationship and a relationship scenario are obtained through the received friend addition request, so as to determine whether the relationship scenario is a trustworthy relationship scenario; if yes, the friend identifier is correlated with the user identifier, to establish a friend relationship; and if not, identification verification is performed on the friend identifier, so as to ensure information security in the social networking application.

Figure 4:
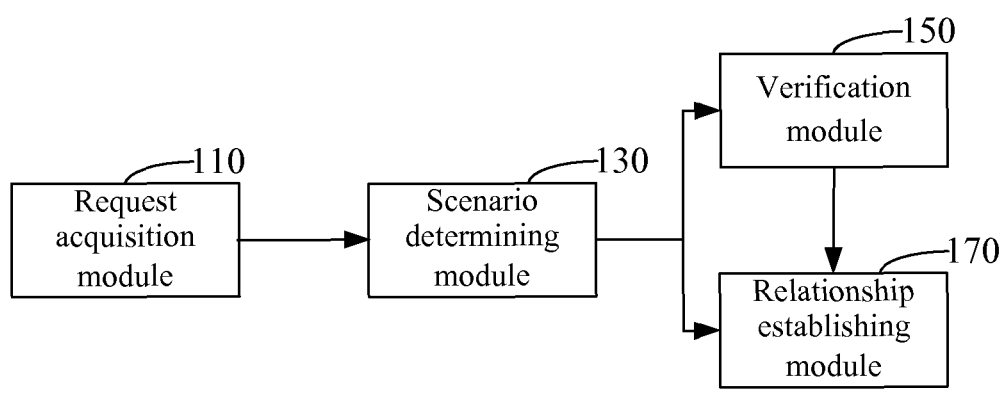
FIG. 4 is a schematic structural diagram of an apparatus for establishing a user relationship in a social networking application according to an implementation.

As shown in FIG. 4, in an implementation, an apparatus for establishing a user relationship in a social networking application includes a request acquisition module 110, a scenario determining module 130, a verification module 150, and a relationship establishing module 170.

The request acquisition module 110 is configured to receive a user addition request.

In this implementation, after a user addition request initiated by a user through the social networking application is received, the request acquisition module 110 acquires the received user addition request, and knows, through the user addition request, which user initiates a request for establishing a user relationship based on the social networking application.

Specifically, the user relationship is an inter-relationship between a current user and other users in the social networking application. For example, a user relationship exists between each contact person recorded in an address book and a mobile terminal user in a social networking application installed on a mobile terminal. The social networking application stores, through the received user addition request, a contact person who requests to be added in the user relationship in the address book, to establish an inter-relationship between the mobile terminal user and the contact person who requests to be added in the user relationship. In addition, the user relationship may be a friend relationship, an inter-relationship between a contact person based on an e-mail and a user of the e-mail, and the like; and the details are not listed herein.

Figure 5:
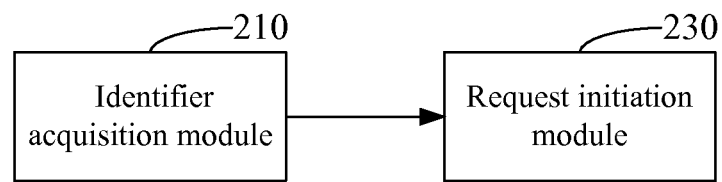
FIG. 5 is a schematic structural diagram of an apparatus for establishing a user relationship in a social networking application according to another implementation.

As shown in FIG. 5, in another implementation, the apparatus for establishing a user relationship in a social networking application further includes an identifier acquisition module 210 and a request initiation module 230.

The identifier acquisition module 210 is configured to acquire, from a predefined relationship scenario, an identifier of a user who requests to be added in a user relationship, and obtain a corresponding social networking application identifier according to the user identifier.

In this implementation, the relationship scenario is a source of a user with whom a user relationship is expected to be established, and is a certain social networking application scenario where a user relationship exists between a user with whom a user relationship is expected to be established and the user initiating the user addition request. For example, in a social networking application like an instant communication tool, the identifier acquisition module 210 can obtain a selected user through a selection operation in a relationship scenario of a user list obtained through a location-based friends making approach, so as to obtain an instant communication identifier corresponding to the selected user according to a correspondence between a user identifier and an instant communication tool identifier, where the selected user and a user triggering the selection operation are strangers to each other.

In addition to the relationship scenario of the user relationship obtained through a location-based friends making approach, the relationship scenario may also be a user relationship obtained through a topic-based friends making approach in a social networking application, or may be a user relationship obtained through a behavior-based friends making approach; and may also be a user relationship based on information of a phone address book or an e-mail contact person; the details are not listed herein. The selected relationship scenario is different from the relationship scenario in the currently used social networking application.

The request initiation module 230 is configured to initiate a user addition request according to the social networking application identifier.

In this implementation, after a social networking application identifier corresponding to the selected user identifier is obtained, the request initiation module 230 initiates, according to the social networking application identifier, the user addition request to a client where the social networking application identifier is located.

In the apparatus for establishing a user relationship in a social networking application, a user obtains, through selection, a user identifier in the currently used social networking application according to user relationship information in a relationship scenario, and a user relationship exists in the relationship scenario between the user and a user corresponding to the user identifier; a social networking application identifier in terms of the user in the social networking application currently used by the user is obtained according to the user identifier, and then, a user addition request for establishing a user relationship based on the currently used social networking application is initiated to the user.

The scenario determining module 130 is configured to determine whether the user addition request is initiated from a predefined trustworthy relationship scenario; if not, inform the verification module 150, and if yes, inform the relationship establishing module 170.

In this implementation, the received user addition request includes information such as the social networking application identifier corresponding to the user initiating the user addition request and the relationship scenario where the user addition request is triggered. For example, when the initiated user addition request is received, the user may know, by viewing an interaction interface of the social networking application, the identifier of the user initiating the user addition request and know which user relationship information, that is, which relationship scenario, the user initiating the user addition request comes from.

In the interaction performed between users via the Internet, the existing user relationship may on the basis of strangers, and may also on the basis of acquaintances. Compared with a relationship scenario obtained when the users are strangers to each other, the user relationship information, namely, the relationship scenario obtained when users are acquaintances to each other should be trustworthy. The possibility that the users from the trustworthy relationship scenario threaten the information security of the currently used social networking application is low; instability exists when the user is not from the trustworthy relationship scenario, and identification verification should be performed thereon.

The verification module 150 is configured to perform verification on the identifier of the user initiating the user addition request, and inform the relationship establishing module 170 of a verification result.

In this implementation, the verification module 150 performs verification on the user initiating the user addition request to obtain the verification result, and determines whether the verification result is that the verification succeeds; if yes, informs the relationship establishing module 170 to establish the user relationship, and if not, ends the flow.

The relationship establishing module 170 is configured to establish a user relationship according to the identifier of the user initiating the user addition request.

In another implementation, the foregoing apparatus for establishing a user relationship in a social networking application further includes a checking module. The checking module is configured to check whether to perform verification on an identifier of a user initiating a user addition request in the trustworthy relationship scenario, if yes, inform the verification module 150, and if not, inform the relationship establishing module 170.

In this implementation, when it is determined that the relationship scenario where the user addition request is initiated is the trustworthy relationship scenario, the checking module checks whether an option of performing verification on the identifier of the user initiating the user addition request in the trustworthy relationship scenario is set; if yes, informs the verification module 150 to perform verification thereon, to further improve information security in the social networking application, and if not, informs the relationship establishing module 170 to directly establish the user relationship.

Figure 6:
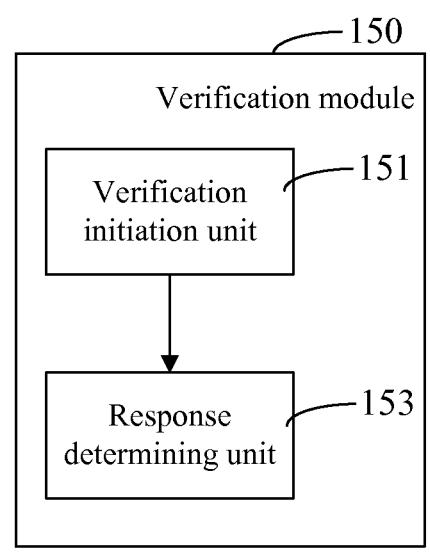
FIG. 6 is a schematic structural diagram of a verification module according to an implementation.

As shown in FIG. 6, in an implementation, the verification module 150 includes a verification initiation unit 151 and a response determining unit 153.

The verification initiation unit 151 is configured to initiate a verification request according to the identifier of the user initiating the user addition request.

In this implementation, the verification initiation unit 151 initiates the verification request to a client where the identifier of the user initiating the user addition request is located, so that the user initiating the user addition request performs identification verification according to the verification request.

The response determining unit 153 is configured to receive verification response information of the verification request, and determine whether the verification succeeds according to the verification response information, if yes, establish the user relationship, and if not, reject the user addition request.

In this implementation, after receiving the verification request, the client where the identifier of the user initiating the user addition request is located obtains the verification response information according to the verification request, where the verification response information is generated when the user replies to the verification request; and then, the response determining unit 153 determines whether the received verification response information conforms to preset verification information, and if yes, directly establishes a user relationship.

For example, the verification request includes a question preset by the user. After the verification request is received, the user replies to the preset question to generate the verification response information, so that the response determining unit 153 determines whether the content recorded in the verification response information is consistent with the preset answer to the question; if yes, establishes the user relationship, and if not, rejects the received user addition request.

In the method and the apparatus for establishing a user relationship in a social networking application, after the user addition request is acquired, it is determined whether the relationship scenario where the user addition request is initiated is the trustworthy relationship scenario. If the scenario is not the trustworthy relationship scenario, verification is performed on the identifier of the user initiating the user addition request, and the user relationship can be established merely when the verification succeeds, so as to prevent the user initiating the user addition request from looking at the information of other users in the social networking application at will when the user identifier is the stranger, thereby improving information security in the social networking application.

The method and the apparatus for establishing a user relationship in a social networking application import users from various relationship scenarios for the social networking application of the user, establish the user relationship based on the social networking application, and protect the user privacy by performing verification on an identifier of a user initiating the user addition request and does not belong to the set trustworthy relationship scenario.

Persons of ordinary skill in the art should understand that all or a part of the flow of the method according to the implementations may be implemented by a program instructing relevant hardware. The program may be stored in a computer readable storage medium. When the program is executed, the flow of the implementation of the foregoing method may be included. The storage medium may be a magnetic disk, an optical disk, a Read-Only Memory (ROM) or a Random Access Memory (RAM), and the like.

Figure 7:
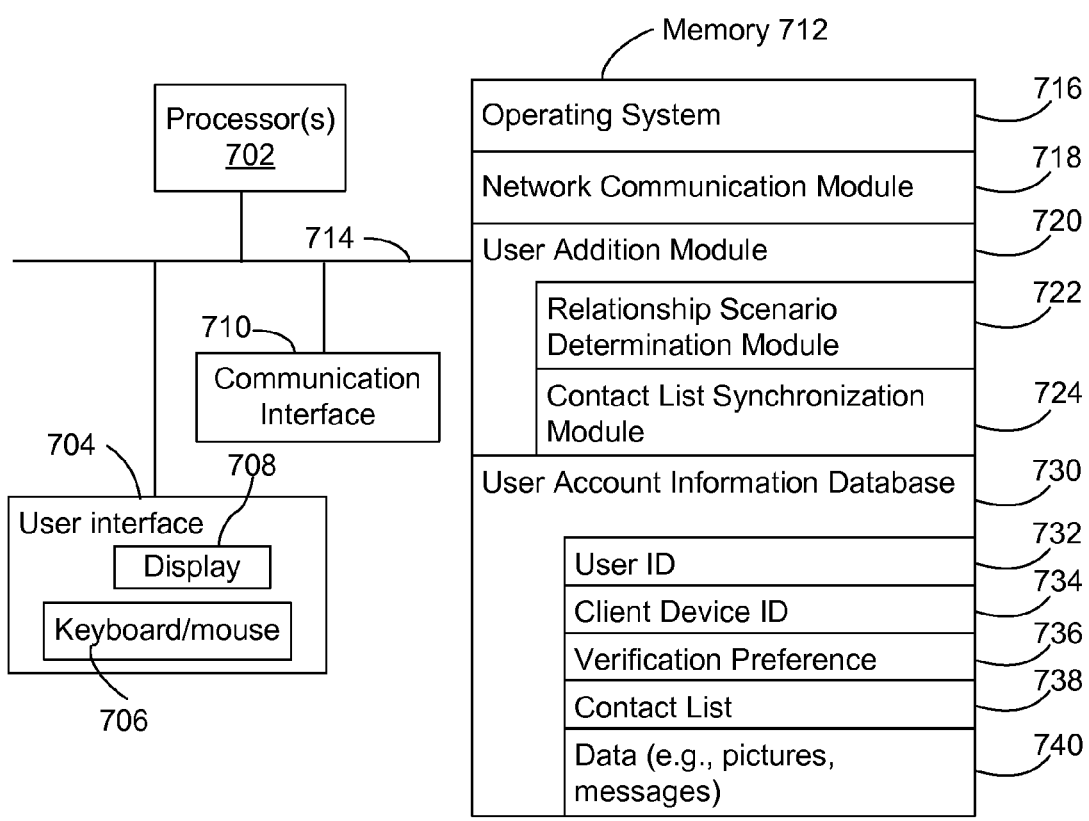
FIG. 7 is a block diagram of a server for adding a second user to a first user's contact list according to another implementation.
Figure 8:
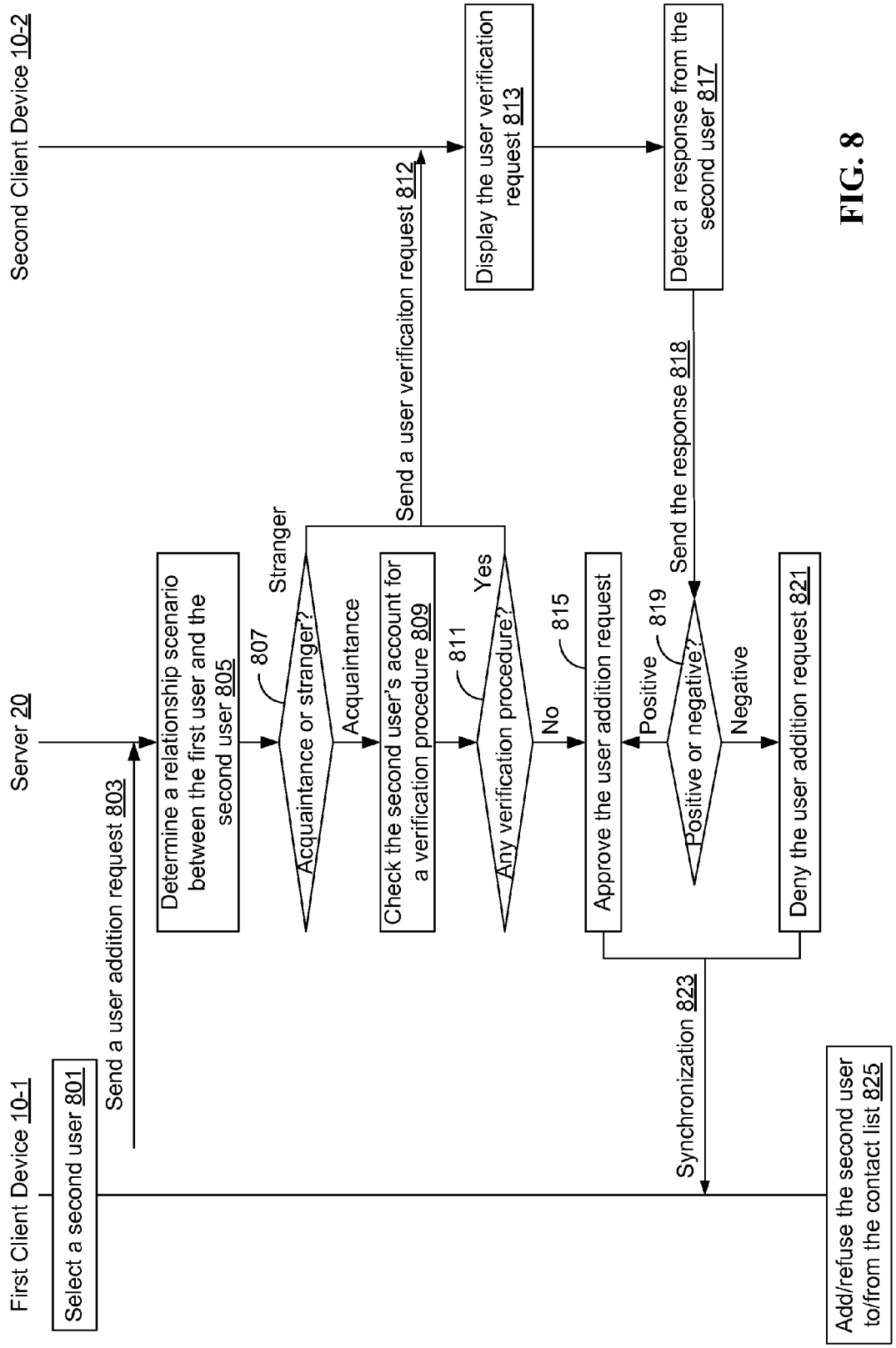
FIG. 8 is a flow chart illustrating how of the server handles the first user's request to add the second user to the first user's contact list according to an implementation.

FIG. 7 is a block diagram of a server 20 for adding a second user to a first user's contact list according to another implementation. The server 20 includes memory 712; one or more processors 702 for executing modules, programs and/or instructions stored in the memory 712 and thereby performing predefined operations; one or more network or other communications interfaces 710; and one or more communication buses 714 for interconnecting these components. In some implementations, the server 20 includes a user interface 704 comprising a display device 708 and one or more input devices 706 (e.g., keyboard or mouse). In some implementations, the memory 712 includes high-speed random access memory, such as DRAM, SRAM, or other random access solid state memory devices. In some implementations, memory 712 includes non-volatile memory, such as one or more magnetic disk storage devices, optical disk storage devices, flash memory devices, or other non-volatile solid state storage devices. In some implementations, memory 712 includes one or more storage devices remotely located from the processor(s) 702. Memory 712, or alternately one or more storage devices (e.g., one or more nonvolatile storage devices) within memory 712, includes a non-transitory computer readable storage medium. In some implementations, memory 712 or the computer readable storage medium of memory 712 stores the following programs, modules and data structures, or a subset thereof:

- an operating system 716 that includes procedures for handling various basic system services and for performing hardware dependent tasks;
- a network communications module 718 that is configured to connect the server 20 to other computers (e.g., the first client device 10-1 and second client device 10-2 in FIG. 8) via the communication network interfaces 710 and one or more communication networks (wired or wireless), other wide area networks (e.g., the Internet), local area networks, metropolitan area networks, etc.;
- a user addition module 720 configured to receive and process a user addition request from a client device 10, the user addition module 720 further including (i) a relationship scenario determination module 722 configured for determining a scenario or setting in which the first user encounters the second user (or more specifically, an identifier of the second user), which indicates whether the two users were already acquaintances or strangers before this encounter and (ii) a contact list synchronization module 724 configured for synchronizing a contact list associated with a user account at the server 20 with a contact list associated with the same user at a client device; and
- a user account information database 730 configured for storing a plurality of user accounts associated with a service (e.g., a social networking or instant messaging service) hosted by the server 20, each user account including a user identifier 732 for uniquely identifying a user of the service, a client device identifier 734 for uniquely identifying a client device (e.g., a smartphone) used by the user for accessing the service, a verification preference 736 for indicating whether the user requires any verification procedure before granting another user adds the user to his/her contact list, a contact list 738 including one or more identifiers of other users of the same service that have communicated with the user before, and data 740 associated with the user, e.g., pictures uploaded by the user into his/her account and text messages posted by the user in his/her account, etc.

It should be noted that the modules and datasets in the server 20 describe above in connection with FIG. 7 may be implemented on a single computer server or distributed among multiple computer servers that are connected by a computer network. Although a specific hardware configuration may affect the performance of the server 20, the implementation of the present application is not dependent on a particular hardware configuration.

The widespread use of social networking applications on mobile devices such as smartphones significantly enriches many people's life. As noted above, people, regardless of their geographical locations and demographic backgrounds, may be able to communicate and share information with each other and then become good friends on the invisible platform provided by a social networking application. On the other hand, people have increasing concerns over the privacy invasion issues on social networking applications. One objective of the present application is to provide a mechanism for people to have more control over the exposure of their personal or private information on the social networking applications.

FIG. 8 is a flow chart illustrating how of the server 20 handles the first user's request to add the second user to the first user's contact list according to an implementation. In this example, there are three parties, a first client device 10-1 used by the first user, a second client device 10-2 used by the second user, and the server that communicates with both the first client device and the second client device. In some implementations, the first and second client devices may be one selected from the group consisting of a desktop, a laptop, a smartphone, a tablet, etc. For illustrative purposes, it is assumed that both the first client device and the second client device are smartphones that install a social networking application like WeChat from Tencent. This social networking application can not only allow acquaintances to send text/audio/video messages to each other but also bring strangers together based on their common interest in a particular topic or their demographic and/or geographic proximity. To prevent unintended consequences, e.g., accidental release of a user's personal or private information (e.g., social security number or date of birth) to a stranger, the server implements a mechanism to screen a request from any user to add another user to his/her contact list.

As shown in FIG. 8, the first user at the first client device 10-1 selects (801) a second user (or an identifier of the second user) and decides to add the second user to his/her contact list by sending (803) a user addition request to the server 20. For example, the first user may encounter the second user, physically or in the cyberspace (e.g., through the same social networking application), when they were swinging their respective smartphones at the same time and at or near the same location. The two users may or may not know each other. In some implementations, the first user needs to add the second user to his/her contact list at the very beginning before they can continue their communication. In some other implementations, the first user can choose to add the second user to his/her contact list after they have communicated with each other for a certain time period. In some implementations, the first user may spot the identifier of the second user in a different application (e.g., telephone or email) and decide to add the second user to his/her contact list. In this case, the second user's telephone number or email address is his/her identifier.

Upon receipt of the user addition request, the server determines (805) a relationship scenario between the first user and the second user. As noted above, the identifier of the second user may be an indicator of the relationship scenario between the two users. For example, if the identifier of the second user is found in the contact list of another application running on the first client device 10-1, the two users are deemed to be acquaintances of each other because it is assumed that the two users have encountered at least once before. Conversely, if it is the first time that the second user's identifier appears on the first client device 10-1 for the first time and it is not present in any contact list associated with the first user, the two users are deemed to be strangers to each other.

If the second user is deemed to be a stranger to the first user (807-Stranger), the server 20 then sends (812) a user verification request to the second client device 10-2 associated with the second user. If the second user is deemed to be an acquaintance of the first user (807—Acquaintance), the server 20 does not necessarily add the second user to the contact list of the first user immediately. As noted above in connection with FIG. 7, each user account includes a verification preference indicating the level of control the user chooses to exercise in response to a request to add this user to another user's contact list. Possible control levels include: automatic approval for user addition requests from any user without any prior verification, automatic approval for only requests from acquaintances and manual verification for requests from strangers, manual verification for any requests, and automatic denial of requests from strangers and manual verification for requests from acquaintances, etc. If the second user's account indicates that the second user requires a verification procedure for requests from acquaintances (811—Yes), the server 20 also sends (812) a user verification request to the second client device 10-2 associated with the second user. Otherwise (811—No), the server 20 then approves (815) the user addition request.

The second client device 10-2 displays (813) the user verification request. In some implementations, the user verification request may be in the form of a text message or an email message including a link to the service hosted at the server 20. In some other implementations, the user verification request may be in the form of a pop-up window at the second client device 10-2 if the second user is using the same service hosted by the server 20. Upon detection (817) of a response from the second user at the second client device, the second client device 10-2 then sends (818) the response back to the server 20. In some implementations, the response is either positive (i.e., the second user agrees to be added to the first user's contact list) or negative (i.e., the second user refuses to be added to the first user's contact list). If positive (819—Positive), the server 20 then approves (815) the user addition request; if negative (819—Negative), the server 20 then denies (821) the user addition request. In either case, the server 20 needs to synchronize (823) itself with the first client device 10-1. For example, if the second user is added to the first user's contact list, the first user's contact list at the first client device 10-1 should be updated accordingly. Alternatively, if the second user is not added to the first user's contact list, the first client device 10-1 should be notified as well since the original user addition request was initiated from the first client device 10-1. In response, the first client device 10-1 (825) either adds the identifier of the second user to its contact list or refuses to do so based on the instruction from the server 20.

In some implementations, the addition of the second user to the contact list of the first user is to make the first user's data under his/her account available to the second user. To further refine the first user's control over the information to be shared with the second user, the server 20 further offers multiple levels of acquaintance or friend for the user to choose such as a family member, a classmate, a colleague, and a friend. For example, a dropdown list may be generated on the screen of the first client device 10-1 listing the different levels of friendship for the first user to characterize his/her relationship with the second user. Upon receipt of the friendship level selected by the first user, the server 20 then updates the account associated with the first user to include the user-selected friendship level. Note that the user-selected friendship level is configured to control share of information between the first user and the second user. If the first user chooses the family member level, the server 20 is then notified that it should make all the data associated with the first user's account at the server available to the second user. Similarly, the classmate, colleague, and friend levels grant less and less right to the second user to access to the first user's data. To support this feature, the first user is reminded of selecting a level of visibility for a piece of data uploaded into his/her account at the server 20.

Otherwise, a default level of visibility is assigned to the piece of data and the default level of visibility can be set/modified by the user in his/her profile.

In some implementations, the server 20 implements a principle of reciprocity between the first and second users. In other words, after receiving the second user's positive response of approving itself to be added to the first user's contact list, the server 20 automatically adds the first user's identifier to the second user's contact list. The level of friendship chosen by the first user for the second user is also applied to the first user's right to access the second user's data. In some other implementations, the level of friendship may be the same for both users initially but can be modified subsequently by either user such that the friendship level of the second user at the first user's account can be different from the friendship level of the first user at the second user's account. For example, when the first user changes the second user's level of friendship, the server 20 may automatically notify the second user and optionally seek prior approval from the second user before completing such update. In some implementations, the server 20 only notifies the second user if his/her friendship level is lowered (which limits the second user's data access right) but silently increases the second user's data access request if otherwise. In some other implementations, the server 20 notifies the second user of any changes to his/her level of friendship. Like the reciprocity of user addition, the change of level of friendship may be reciprocal as well.

While particular embodiments are described above, it will be understood it is not intended to limit the invention to these particular embodiments. On the contrary, the invention includes alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the embodiments.

Although the terms first, second, etc. may be used herein to describe various elements, these elements should not be limited by these terms. These terms are only used to distinguish one element from another. For example, first ranking criteria could be termed second ranking criteria, and, similarly, second ranking criteria could be termed first ranking criteria, without departing from the scope of the present invention. First ranking criteria and second ranking criteria are both ranking criteria, but they are not the same ranking criteria.

The terminology used in the description of the invention herein is for the purpose of describing particular embodiments only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, operations, elements, and/or components, but do not preclude the presence or addition of one or more other features, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

Although some of the various drawings illustrate a number of logical stages in a particular order, stages that are not order dependent may be reordered and other stages may be combined or broken out. While some reordering or other groupings are specifically mentioned, others will be obvious to those of ordinary skill in the art and so do not present an exhaustive list of alternatives. Moreover, it should be recognized that the stages could be implemented in hardware, firmware, software or any combination thereof.

The foregoing description, for purpose of explanation, has been described with reference to specific implementations. However, the illustrative discussions above are not intended to be exhaustive or to limit the invention to the precise forms disclosed. Many modifications and variations are possible in view of the above teachings. The implementations were chosen and described in order to best explain principles of the invention and its practical applications, to thereby enable others skilled in the art to best utilize the invention and various implementations with various modifications as are suited to the particular use contemplated. Implementations include alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the implementations.

What is claimed is:

1. A method for adding a second user to a first user's contact list for a first application, the method comprising:
   at a server having one or more processors and memory for storing programs to be executed by the one or more processors:
      receiving a user addition request from a first client device associated with the first user, the user addition request including an identifier of the second user;
      determining a relationship scenario between the first user and the second user based on whether the identifier of the second user is in a contact list for a second application with which the first user has an account, wherein the relationship scenario indicates that the second user is an acquaintance of the first user if the second user's identifier is in the contact list of the second application; and
      if the relationship scenario indicates that the second user is an acquaintance of the first user:
         checking an account associated with the second user to determine whether the second user requires a verification procedure for linking the second user to another user; and
         adding the second user's identifier to the first user's contact list for the first application if there is no verification procedure according to the account associated with the second user.

2. The method of claim 1, wherein the second application is one selected from the group consisting of an instant communication application, a telephone application, and an email communication application.

3. The method of claim 1, further including:
if the relationship scenario indicates that the second user is a stranger to the first user or if there is a verification procedure according to the account associated with the second user:
sending a user verification request to a second client device associated with the second user; and
adding the second user's identifier to the first user's contact list for the first application after receiving a positive response from the second client device;
wherein the second user is a stranger to the first user if the identifier of the second user has not previously been detected by the first application.

4. The method of claim 1, wherein adding the second user's identifier to the first user's contact list for the first application includes:
providing a plurality of friendship levels to the first client device for display to the first user;
receiving a selection, by the first user, of a respective one of the plurality of friendship levels; and
updating the account associated with the first user to include the user-selected friendship level, wherein the user-selected friendship level is configured to control share of information between the first user and the second user.

5. The method of claim 4, wherein the plurality of friendship levels include: a family member, a classmate, a colleague, and a friend.

6. The method of claim 4, further comprising: adding an identifier for the first user to a contact list for the first application associated with the second user.

7. The method of claim 6, wherein the friendship level of the second user at the first user's account is the same as the friendship level of the first user at the second user's account.

8. The method of claim 6, wherein the friendship level of the second user at the first user's account is different from the friendship level of the first user at the second user's account.

9. A server configured to add a second user to a first user's contact list for a first application, comprising:
one or more processors; and
memory storing one or more programs to be executed by the one or more processors, the one or more programs including instructions for:
receiving a user addition request from a first client device associated with the first user, the user addition request including an identifier of the second user;
determining a relationship scenario between the first user and the second user based on whether the identifier of the second user is in a contact list for a second application with which the first user has an account, wherein the relationship scenario indicates that the second user is an acquaintance of the first user if the second user's identifier is in the contact list of the second application; and
if the relationship scenario indicates that the second user is an acquaintance of the first user:
checking an account associated with the second user to determine whether the second user requires a verification procedure for linking the second user to another user; and
adding the second user's identifier to the first user's contact list for the first application if there is no verification procedure according to the account associated with the second user.

10. The server of claim 9, wherein the instructions for adding the second user's identifier to the first user's contact list for the first application include instructions for:
providing a plurality of friendship levels to the first client device for display to the first user;
receiving a selection, by the first user, of a respective one of the plurality of friendship levels; and
updating the account associated with the first user to include the user-selected friendship level, wherein the user-selected friendship level is configured to control share of information between the first user and the second user.

11. The server of claim 10, wherein the plurality of friendship levels include: family members, classmates, colleagues, and friends.

12. A non-transitory computer readable storage medium storing one or more programs configured to be executed by a computer system, the one or more programs comprising instructions for:
receiving a user addition request from a first client device associated with the first user, the user addition request including an identifier of the second user;
determining a relationship scenario between the first user and the second user based on whether the identifier of the second user is in a contact list for a second application with which the first user has an account, wherein the relationship scenario indicates that the second user is an acquaintance of the first user if the second user's identifier is in the contact list of the second application; and
if the relationship scenario indicates that the second user is an acquaintance of the first user:
checking an account associated with the second user to determine whether the second user requires a verification procedure for linking the second user to another user; and
adding the second user's identifier to the first user's contact list for the first application if there is no verification procedure according to the account associated with the second user.

13. The non-transitory computer readable storage medium of claim 12, wherein the second application is one selected from the group consisting of an instant communication application, a telephone application, and an email communication application.

14. The non-transitory computer readable storage medium of claim 12, the one or more programs further comprising instructions for:
if the relationship scenario indicates that the second user is a stranger to the first user or if there is a verification procedure according to the account associated with the second user:
sending a user verification request to a second client device associated with the second user; and
adding the second user's identifier to the first user's contact list for the first application after receiving a positive response from the second client device;
wherein the second user is a stranger to the first user if the identifier of the second user has not previously been detected by the first application.

15. The non-transitory computer readable storage medium of claim 12, wherein adding the second user's identifier to the first user's contact list for the first application includes:
providing a plurality of friendship levels to the first client device for display to the first user;

receiving a selection, by the first user, of a respective one of the plurality of friendship levels; and updating the account associated with the first user to include the user-selected friendship level, wherein the user-selected friendship level is configured to control share of information between the first user and the second user.

16. The non-transitory computer readable storage medium of claim 15, wherein the plurality of friendship levels include: a family member, a classmate, a colleague, and a friend.

17. The non-transitory computer readable storage medium of claim 15, the one or more programs further comprising instructions for: adding an identifier for the first user to a contact list for the first application associated with the second user.

18. The non-transitory computer readable storage medium of claim 17, wherein the friendship level of the second user at the first user's account is the same as the friendship level of the first user at the second user's account.

19. The non-transitory computer readable storage medium of claim 17, wherein the friendship level of the second user at the first user's account is different from the friendship level of the first user at the second user's account.

* * * * *